(12) United States Patent
Rivas et al.

(10) Patent No.: US 9,579,893 B2
(45) Date of Patent: Feb. 28, 2017

(54) CONTROLLING ADHESIVES BETWEEN SUBSTRATES AND CARRIERS

(71) Applicant: HEWLETT-PACKARD DEVELOPMENT COMPANY, L.P., Houston, TX (US)

(72) Inventors: Rio Rivas, Corvallis, OR (US); Ed Friesen, Corvallis, OR (US); Lawrence Thurber, Albany, OR (US); Garrett E. Clark, Corvallis, OR (US); Rosanna L. Bigford, Albany, OR (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 15/257,625

(22) Filed: Sep. 6, 2016

(65) Prior Publication Data
US 2016/0368267 A1    Dec. 22, 2016

Related U.S. Application Data (63) Continuation of application No. 14/394,696, filed as application No. PCT/US2012/042943 on Jun. 18, 2012, now Pat. No. 9,475,278.

(51) Int. Cl.
*B41J 2/05*   (2006.01)
*B41J 2/14*   (2006.01)
*B41J 2/175*  (2006.01)

(52) U.S. Cl.
CPC ......... *B41J 2/1433* (2013.01); *B41J 2/17503* (2013.01)

(58) Field of Classification Search
CPC .......................................... B41J 2/01
USPC .................................. 347/65, 67; 216/27
See application file for complete search history.

(56) References Cited

U.S. PATENT DOCUMENTS

| | | | |
|---|---|---|---|
| 6,033,581 A | 3/2000 | Kobayashi | |
| 6,209,993 B1 * | 4/2001 | Wang | B41J 2/1603 347/65 |
| 6,318,843 B1 | 11/2001 | Feder et al. | |
| 6,536,879 B2 | 3/2003 | Ito et al. | |
| 6,890,065 B1 * | 5/2005 | Spivey | B41J 2/14024 347/102 |

(Continued)

FOREIGN PATENT DOCUMENTS

| | | |
|---|---|---|
| CN | 1291547 | 4/2001 |
| JP | 2000211145 A | 8/2000 |

(Continued)

OTHER PUBLICATIONS

Lindemann, et al; "One Inch Thermal Bubble Jet Printhead with Laser Structured Integrated Polyimide Nozzle Plate"; Journal of Microeletromechanical Systems, vol. 16, No. 2, Apr. 2007; pp. 410-428.

*Primary Examiner* — Lam Nguyen
(74) *Attorney, Agent, or Firm* — HP Inc—Patent Department (57) ABSTRACT

Controlling adhesives between substrates and carriers includes forming a depression into a bonding area of a backside surface of a substrate of a print head where the bonding area being formed proximate an ink feed slot formed through the thickness of the substrate from the backside surface to a front side surface; placing an adhesive between the bonding area and a substrate carrier, and moving the substrate and the substrate carrier together such that the adhesive flows into the depression.

15 Claims, 6 Drawing Sheets

(56) References Cited

U.S. PATENT DOCUMENTS

| | | |
|---|---|---|
| 7,354,138 B2 | 4/2008 | Yokouchi |
| 8,029,112 B2 | 10/2011 | Morgan et al. |
| 2008/0170102 A1 | 7/2008 | Kim et al. |
| 2009/0309938 A1 | 12/2009 | Yoneda |
| 2011/0102509 A1 | 5/2011 | Sharan et al. |

FOREIGN PATENT DOCUMENTS

| | | |
|---|---|---|
| JP | 200118392 | 1/2001 |
| JP | 2002307687 A | 10/2002 |
| JP | 2007111902 A | 5/2007 |
| JP | 2009172808 A | 8/2009 |
| JP | 2010-269499 | 12/2010 |

\* cited by examiner

CONTROLLING ADHESIVES BETWEEN SUBSTRATES AND CARRIERS

BACKGROUND

In inkjet printing, ink droplets are released from an array of nozzles in a print head onto a printing medium, such as paper. The ink bonds to a surface of the printing medium and forms graphics, text, or other images. The ink droplets are released with precision to ensure that the image is accurately formed. Generally, the medium is conveyed under the print head while the droplets are selectively released. The medium's conveyance speed is factored into the droplet release timing.

Print heads typically include a number of ink chambers, also referred to as firing chambers. Each ink chamber is in fluid communication with one of the nozzles in the array and provides the ink to be deposited by that respective print head nozzle. Prior to a droplet release, the ink in the ink chamber is restrained from exiting the nozzle due to capillary forces and/or back pressure acting on the ink within the nozzle passage.

During a droplet release, ink within the ink chamber is forced out of the nozzle by actively increasing the pressure within the chamber. Some print heads use a resistive heater positioned within the chamber to evaporate a small amount of at least one component of the liquid ink. In many cases, a major component of the liquid ink is water, and the resistive heater evaporates the water. The evaporated ink component or components expand to form a gaseous drive bubble within the ink chamber. This expansion exceeds the restraining force enough to expel a single droplet out of the nozzle. Other ink chambers use piezoelectric material membranes to eject ink droplets. The piezoelectric material expands when a voltage is applied to the material, which increases internal pressure of the ink chamber and overcomes the restraining forces enough to expel the droplet.

An ink reservoir may provide ink to the ink chamber. The ink reservoir may be in fluid communication with the chamber with at least one ink feed slot that connects the ink chamber to the ink reservoir. Often, the ink feed slot is formed in a silicon substrate that is bonded to a body of the ink reservoir.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

The width of the ink feed slots may be on the micron scale. As a consequence, small obstructions may adversely affect the ink flow from the ink reservoir to the ink chamber. Also, obstructions may trap air or other gases within the ink chamber. Such air trappings may result in an inadequate ink supply to the nozzles. An adhesive that bonds the substrate to the ink reservoir's body may obstruct the ink flow and air management of the print head if the adhesive bulges far enough into the width of the ink feed slot.

A method for controlling an adhesive between a substrate and a substrate carrier, such as a body of the ink reservoir, may include forming a depression into a bonding area of a backside surface of the substrate of a print head. The bonding area may be formed proximate an ink feed pathway, such as slots, and be formed through the thickness of the substrate from the backside surface to a front side surface. Further, the method may also include placing an adhesive between the bonding area and a substrate carrier and moving the substrate and the substrate carrier together such that the adhesive flows into the depression.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
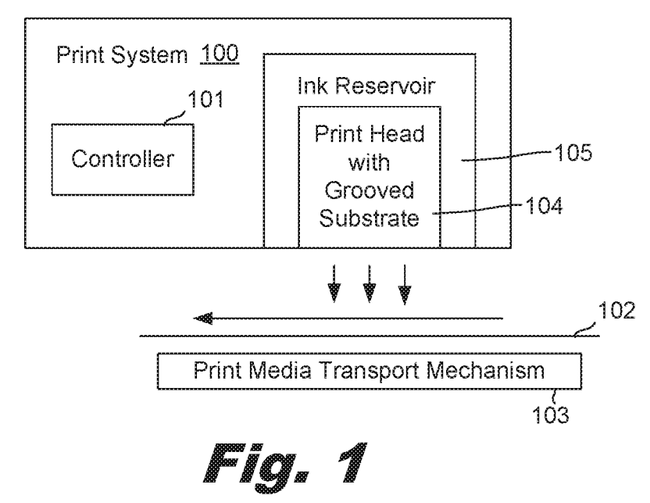
FIG. 1 is a diagram of an illustrative print system, according to principles described herein.

FIG. 1 is a diagram of an illustrative print system (100), according to principles described herein. In this example, the print system (100) may be a printer for home, commercial, or industrial use. A controller (101) of the print system may receive print instructions from a local or remote source to print an image on a print medium (102). The print media may include any type of suitable sheet or roll material, such as paper, card stock, transparencies, Mylar, polyester, plywood, foam board, fabric, canvas, other media, or combinations thereof. The controller (101) may control a transport mechanism (103) that moves a print media under a print head (104). The controller (101) may cause the print head to release ink droplets onto the print media with an array of nozzles formed in the print head. The controller (101) may control the droplet release through piezoelectric material membranes or thermal resistors to increase the internal pressure of the ink chamber enough to expel ink droplets on command.

An ink reservoir (105) may be in fluid communication with the ink chambers of the print head (104). The ink reservoir (105) may supply the ink to the ink chambers through at least one ink feed pathway that is formed in a barrier between the ink reservoir (105) and the ink chambers. In some examples, the ink feed pathway may be a slot, a hole, other pathway, a plurality thereof, of combinations thereof. In the example of FIG. 1, a substrate separates the ink chambers and the ink reservoir (105), and the substrate is grooved on a bonding area of its backside surface.

Figure 2:
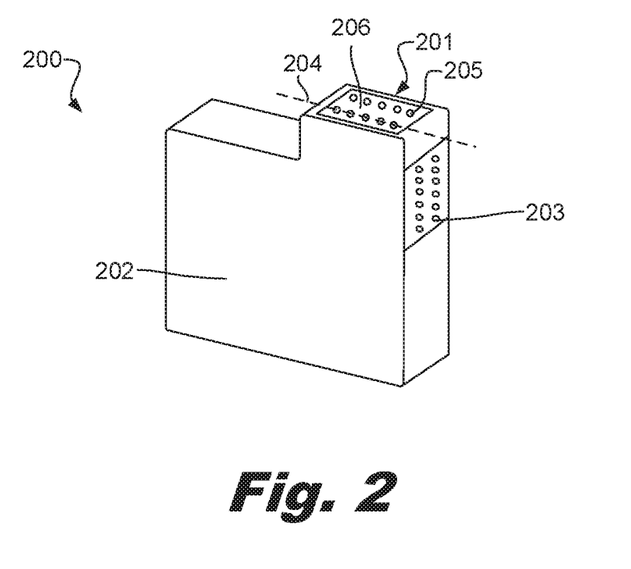
FIG. 2 is a diagram of an illustrative cartridge, according to principles described herein.

FIG. 2 is a diagram of an illustrative cartridge (200), according to principles described herein. In this example, the cartridge (200) is a replaceable integrated ink cartridge that incorporates a print head (201). An ink reservoir (202) may take up a majority of the cartridge's volume and may be dedicated to supplying ink to the print head (201). Electrical contacts (203) may be in electrical communication with the ink chambers and may receive instructions from the print system's controller. In response to a command to fire an ink chamber, the droplet release mechanisms of the print head (201) may increase the internal pressure of the ink chamber enough to release the ink droplet.

Figure 3:
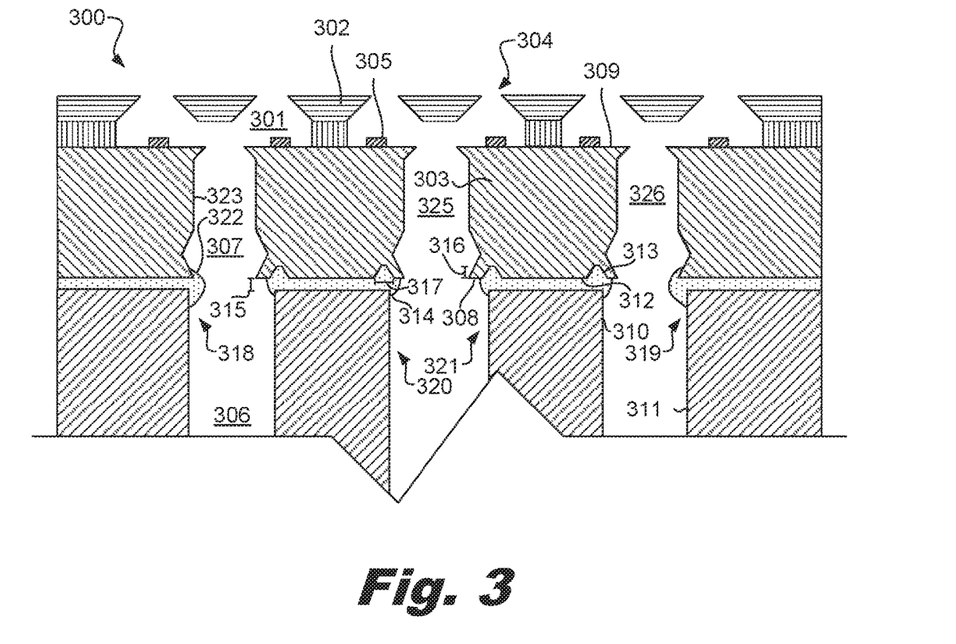
FIG. 3 is a cross sectional diagram of an illustrative print head, according to principles described herein.

In the example of FIG. 2, line (204) indicates that FIG. 3 is a cross sectional view of the print head (201). The print head (201) has a number of nozzles (205) formed in a nozzle layer (206).

FIG. 3 is a cross sectional diagram of an illustrative print head (300) as viewed from line (204) in the example illustrated in FIG. 2. In this example, ink chambers (301) are formed between a nozzle layer (302) and a substrate (303). A number of nozzles (304) are formed in the nozzle layer (302). A droplet release mechanism (305) may be positioned under each nozzle (304) to cause a droplet release upon command. In some examples, the droplet release mechanism (305) is a resistive heater, a piezoelectric material membrane, another ink droplet release mechanism, or combinations thereof. The ink droplet release mechanism may increase the internal pressure of the ink chamber (301) by either expanding itself or forming a bubble to expand. Such expansion may displace a droplet out of the ink chamber through the nozzle.

Ink from an ink reservoir (306) may flow through ink feed slots (307) formed in the substrate (303) to replenish the ink volume lost from the droplet release. While the example of FIG. 3 includes three ink feed slots (307, 325, 326), any number of ink feed slots may be formed in the substrate (303). The ink feed slots (307, 325, 326) may extend the entire thickness of the substrate (303) from a backside surface (308) of the substrate (303) to a front side surface (309) of the substrate (303). In some examples, the ink chamber (301) may be connected to the ink reservoir (306) with at least one ink feed hole or other pathway formed in the substrate.

The backside surface (308) of the substrate (303) may be bonded to the substrate carrier (310) of the ink reservoir's body (311) at bonding areas (312) formed in the backside surface (308). At least one depression (313) may be formed in the bonding areas (312) to accommodate a flow of adhesive (314) when the substrate (303) and the substrate carrier (310) are moved together. In the example of FIG. 3, the depression (313) is a groove that is formed proximate an ink feed slot (326) and follows a length of the ink feed slot (326).

The depressions (313) may prevent the adhesive from bulging into the ink feed slots (326) when the substrate carrier (310) and the substrate (303) are moved together. The adhesive (314) may bond the substrate carrier (310) and the substrate (303) together as well as prevent leaks from one ink feed slot to the other. The substrate (303) may be formed of silicon. In some examples, the substrate is a crystalline substrate, such as a doped crystalline substrate, a non-doped crystalline substrate, monocrystalline silicon substrate, polycrystalline silicon substrate, or combinations thereof. Other examples of suitable substrates include gallium arsenide, gallium phosphide, indium phosphide, glass, silica, ceramics, a semiconducting material, other material, or combinations thereof. The substrate (303) may be between 100 and 2000 microns thick. In some examples, the substrate is approximately 675 microns thick.

The gap height (315) between the substrate (303) and substrate carrier (310) may be between 10 microns and 250 microns. In some examples, the gap height is between 125 and 175 microns. In some examples, the depressions have a depression depth (316) that is substantially equivalent to the gap height (315). In some examples, the depression depth (316) is between 10 microns and 250 microns. In some examples, the depression depth (316) is between 80 and 160 microns.

In some examples, the depression (313) is spaced a distance from the ink feed slots (326). In some examples, the distance is less than 250 microns, less than 150 microns, less than 75 microns, less than 40 microns, less than 15 microns, another distance, or combinations thereof. In some examples, the depression has a depression width (317) that that is less than 250 microns, less than 150 microns, less than 75 microns, less than 40 microns, less than 15 microns, another distance, or combinations thereof.

In the example of FIG. 3, the outside joints (318, 319) have non-depressed bonding areas while the inside joints (320, 321) have grooved bonding areas. In FIG. 3, the adhesive (314) of the outside joints (318, 319) is depicted bulging beyond the ink feed slot's wall (323) and into the space of the ink feed slot (307). On the other hand, the adhesive (314) of the inside joints (320, 321) is captured within the depressions (313) such that the adhesive (314) remains outside of the space of the ink feed slots. In the illustrated example, the adhesive bulge (322) may interfere with the ink flow from the ink reservoir (306) to the ink chambers (301) and/or the bulge (322) may trap air or other debris in the ink feed slot (307).

The ink feed slots (307, 325, 326) may have an increasingly larger cross sectional area as the walls of the ink feed slots (307, 325, 326) approach the backside surface (308) from the front side surface (309). Air or bubbles may enter into the ink chambers (301) when a droplet is released, through leaks in the print head, or for other reasons. Bubbles in the ink chamber may interfere with the droplet release, and ink feed slot's progressively larger diameter may provide a path that easily allows the bubbles to move away from the ink chamber (301). However, debris or adhesive bulges may trap the bubbles within the ink feed slots (307, 325, 326). As a consequence, the depressions (313) in the bonding areas (312) may prevent air trappings in the ink feed slots (307, 325, 326).

Figure 4:
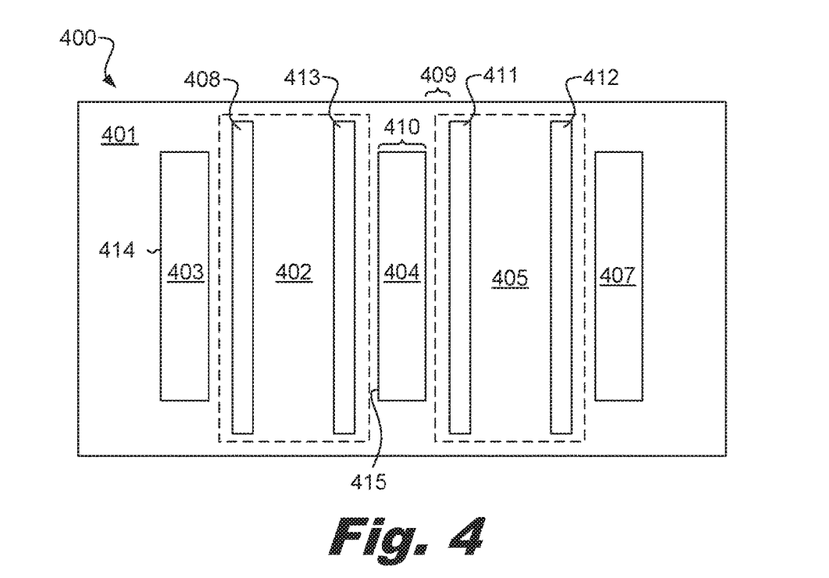
FIG. 4 is a diagram of an illustrative backside surface of a substrate, according to principles described herein.

FIG. 4 is a diagram of an illustrative backside surface (400) of a substrate (401), according to principles described herein. In this example, a first bonding area (402) is located between a first ink feed slot (403) and a second ink feed slot (404). The first ink feed slot (403) may have a first length (414), and the second first ink feed slot (404) may have a second length (415). A second bonding area (405) may be located between the second ink feed slot (404) and a third ink feed slot (407). In the bonding areas (402, 405), the depressions may take the form of multiple grooves (408, 411, 412, 413) extend along a length of the ink feed slots (403, 404, 407). In the example of FIG. 4, the grooves (408, 411, 412, 413) are substantially parallel with the ink feed slots (403, 404, 407). However, in alternative examples at least one of the grooves (408, 411, 412, 413) may be non-parallel with at least one of the ink feed slots (403, 404, 407). The grooves (408, 411, 412, 413) may be spaced a distance (409) from the ink feed slots (403, 404, 407), and the grooves (408, 411, 412, 413) may extend beyond the length of the ink feed slots (403, 404, 407). In some examples, a depression, such as a groove, is formed along the width (410) of at least one of the ink feed slots (403, 404, 407).

Figure 5:
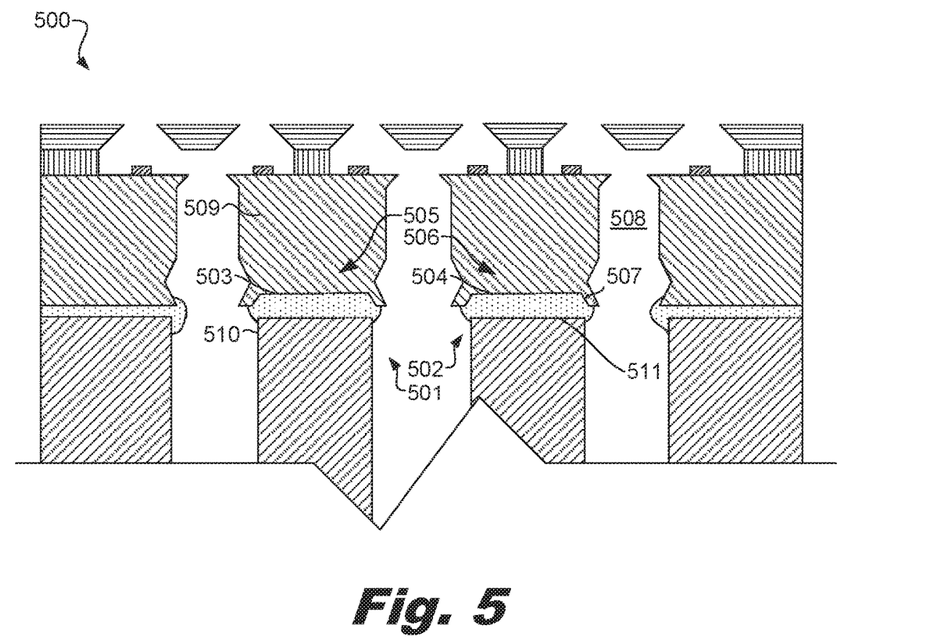
FIG. 5 is a cross sectional diagram of an illustrative print head, according to principles described herein.

FIG. 5 is a cross sectional diagram of an illustrative print head (500), according to principles described herein. In this example, the inside joints (501, 502) have depressions with single grooves (503, 504) that span over fifty percent of the width of the respective bonding areas (505, 506). In some examples, the grooves span ninety-five percent or less of the bonding areas' width. In some examples, the grooves span less than ninety percent of the bonding areas' width, less than seventy-five percent of the bonding areas' width, less than sixty percent of the bonding areas' width, less than another percentage, or combinations thereof.

A groove wall (507) may contribute to retaining some of the adhesive (508) from bulging into the ink feed slots (508). In some examples, the groove wall (507) has a strength sufficient to withstand the expansion forces of the adhesive as the substrate (509) and the substrate carrier (510) come together. In some examples, the groove wall (507) is angled with respect to a surface (511) of the substrate carrier (510). In some examples, the angle formed by the substrate carrier's surface and the groove wall is ninety degrees. In other examples, the angle is between 130 degrees to twenty degrees. In some examples, any suitable angle may be used as long as the angle adequately prevents the adhesive from bulging into the ink feed slots (508).

Figure 6:
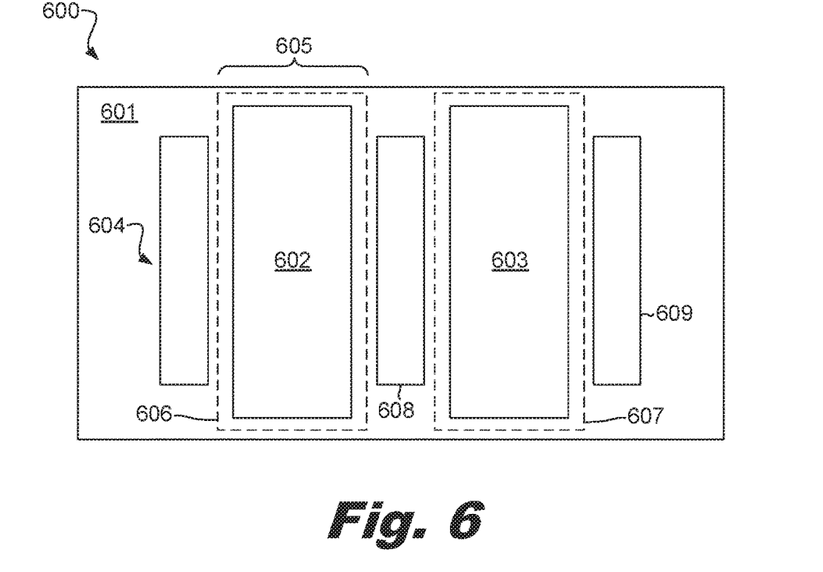
FIG. 6 is a diagram of an illustrative backside surface of a substrate, according to principles described herein.

FIG. 6 is a diagram of an illustrative backside surface (600) of a substrate (601), according to principles described herein. In this example, the depressions are single grooves (602, 603) located between the ink feed slots (604, 608, 609). The grooves (602, 603) may span over fifty percent of the width (605) of the bonding areas (606, 607) located between the ink feed slots (604, 608, 609).

Figure 7:
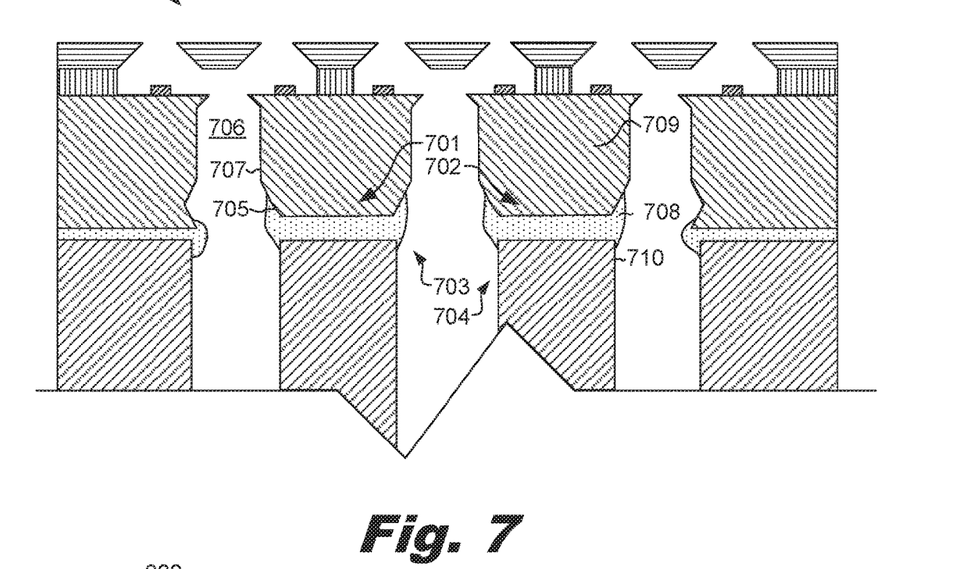
FIG. 7 is a cross sectional diagram of an illustrative print head, according to principles described herein.

FIG. 7 is a cross sectional diagram of an illustrative print head (700), according to principles described herein. In this example, the bonding areas (701, 702) of the inside joints (703, 704) have depressions (705) that are in fluid communication with the ink feed slots (706). For example, at least one of the depressions (705) may join the bonding area (701) to the inside wall (707) of an ink feed slot (706). The adhesive (708) may flow into the depression (705) as the adhesive is displaced as the substrate (709) and the substrate carrier (710) are moved together. In some examples, the adhesive (708) bugles slightly into the space of the ink feed slots (706), but less than the adhesive would have otherwise bulged without the depressions (705). In other examples, the adhesive (708) bugles slightly into the space of the ink feed slots (706), but not far enough to significantly affect the ink flow or to trap air in the ink feed slots (705). In other examples, the depressions (705) that are in fluid communication with the ink feed slots (706) retain the adhesive (708) such that the adhesive (708) does not enter into the space of the ink feed slot (706).

The depressions (705) may have any suitable shape. For example, depressions (705) that are in fluid communication with the ink feed slots (706) may have a flat surface, a convex surface, a concave surface, a curved surface, a pitted surface, a continuous surface, a discontinuous surface, dimpled surface, an angled surface, another surface, or combinations thereof.

Figure 8:
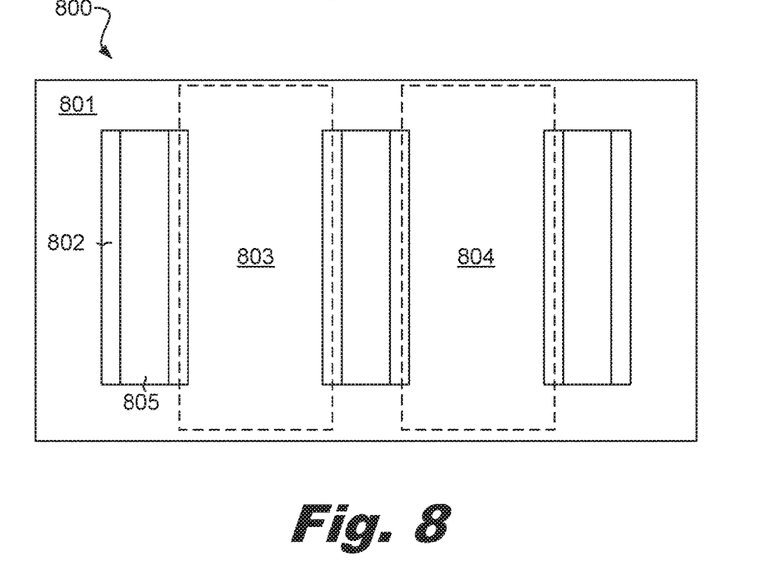
FIG. 8 is a diagram of an illustrative backside surface of a substrate, according to principles described herein.

FIG. 8 is a diagram of an illustrative backside surface (800) of a substrate (801), according to principles described herein. In this example, the depressions (802) are formed, in part, in the bonding areas (803, 804) of the backside surface (800) of the substrate (801). The depressions (802) may connect the bonding areas (803, 804) to a wall of the ink feed slots (805). As the substrate (801) and the substrate carrier are moved together, adhesive between them may extruded into the open space created by the depressions (802).

Figure 9:
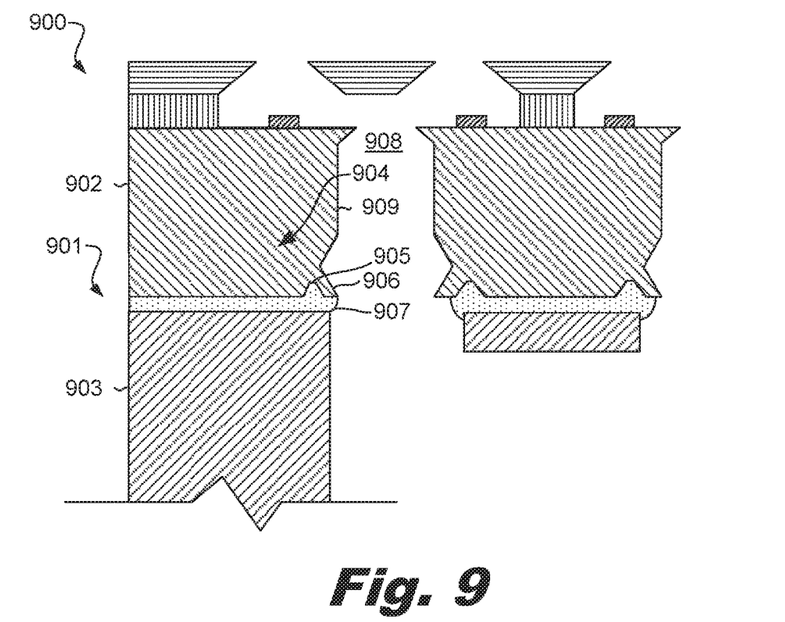
FIG. 9 is a cross sectional diagram of an illustrative section of a print head, according to principles described herein.

FIG. 9 is a cross sectional diagram of an illustrative section of a print head (900), according to principles described herein. In this example, the outside joint (901) of the substrate (902) bonded to the substrate carrier (903) has a bonding area (904) with a depression. In this example, the depression is a groove (905) that forms a retaining lip (906) to restrain the adhesive (907) from bulging into the space of the ink feed slot (908). In other examples, the groove spans over fifty percent of the width of the bonding area (904). In yet other examples, the depression is in communication with ink feed slot (908) such that the depression connects the bonding area (904) to a wall (909) of the ink feed slot (908).

Figure 10:
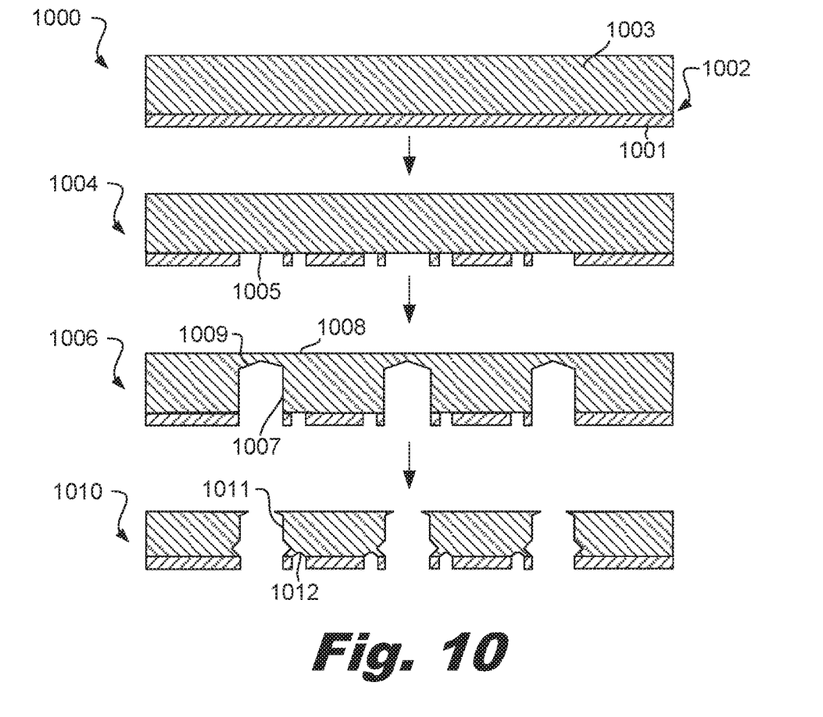
FIG. 10 is a diagram of illustrative manufacturing stages, according to principles described herein.

FIG. 10 is a diagram of illustrative manufacturing stages, according to principles described herein. In this example, during a first stage (1000), an etchant resistant layer (1001) is deposited on a backside surface (1002) of the substrate (1003). The etchant resistant layer (1001) may be a masking layer made of any suitable material that is resistant to etching environments. For example, the etchant resistant layer (1001) may be a grown thermal oxide, a grown or deposited dielectric material such as chemical vapor deposition (CVD) oxides, silicon oxide formed with a tetraethoxysilane (TEOS) precursor, silicon carbide, silicon nitride, aluminum, tantalum, copper, aluminum-copper alloys, aluminum-titanium alloys, gold, other materials, or combinations thereof.

During a second stage (1004) the etchant resistant layer (1001) may be patterned to create exposed areas (1005) of the backside surface (1002) of substrate (1003). In some examples, the etchant resistant layer (1001) is removed using a laser machining process. However, other suitable patterning processes may also be used, such as a photolithographic process in conjunction with a gas or liquid chemical etchant. Some of the exposed areas (1005) may be wider than others. For example, some of the exposed areas may be intended to become ink feed slots while other exposed areas may be intended to become depressions to control an adhesive flow when the substrate is bonded to the substrate carrier. In such an example, the areas intended to be ink feed slots and the areas intended to be depressions may have different widths.

During a third stage (1006), some of the substrate material is removed from exposed areas that are intended to become ink feed slots. In some examples, the material is removed using a laser machining process. Other suitable techniques for removing the material may include silicon dry etch with a plasma enhanced reactive ion etch (RIE) with alternating sulfur hexafluoride (SF6) etching and octafluorobutene (C4F8) deposition, sand drilling, mechanically contacting the substrate material with a saw or an abrasive, other techniques, or combinations thereof. The material removal may result in a trench (1007) that is formed through less than the entire thickness of the substrate (1003). In examples where a thin film layer is deposited on the front side surface (1008) of the substrate, a thin substrate membrane (1009) may be left to protect the thin film layer from any potentially damaging effects of the laser beam or other material removal techniques.

During a fourth stage (1010), additional material may be removed from the substrate (1003) with a wet etch process. In some examples, wet etching is achieved by immersing the substrate (1003) into an anisotropic etchant for a period of time sufficient to complete the formation of the ink feed slots (1011) and to form the depressions (1012). In some examples, the substrate (1003) is immersed in an etchant such as tetramethylamonium hydroxide (TMAH) or potassium hydroxide (KOH), for a period of one to three hours. The etchants may be any anisotropic wet etchant that has selectivity to the etchant resistant layer, any other thin film, and other layers that are intended to remain after the wet etch.

In some examples, a single wet etch process is sufficient to form the ink feed slots (1011) and the depressions (1012) while in other examples multiple wet etch processes are used. For example, different etchants may be used for differing time periods to cause the ink feed slots (1011) or the depressions (1012) to form a predetermined shape. In particular, different etchants may have different etching rates. In other examples, the etchant is anisotropic and thereby etches the substrate in just specific directions. An anisotropic etchant may be used to form a straight section within an ink feed slot, while a fast etching etchant may be used to remove material wider than the exposed area. In some examples, a slow etching etchant is used to etch the narrower sections of the ink feed slots and depressions.

In some examples, different stages and processes are used. Further, the stages may be performed in different orders. For example, the exposed areas may be made for just those areas intended to become ink feed slots (1011) and then just those areas may be etch. After the ink feed slots (1011) are formed, then an etchant mask may be deposited onto the surface of the ink feed slots (1011). Then the areas intended to become depressions (1012) may be machined to remove the etchant resistant layer followed by etching those areas to form the depressions (1012).

Figure 11:
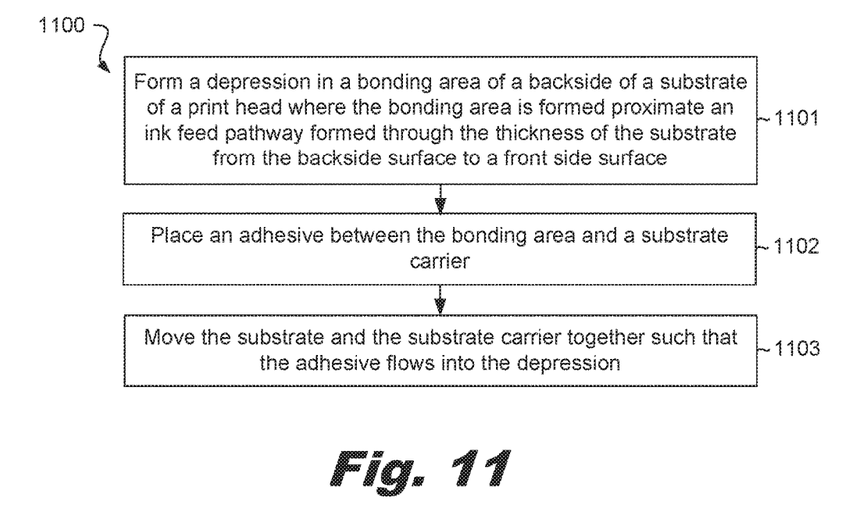
FIG. 11 is a diagram of an illustrative method for controlling adhesives between a substrate and a substrate carrier, according to principles described herein.

FIG. 11 is a diagram of an illustrative method (1100) for controlling adhesives between a substrate and a substrate carrier, according to principles described herein. In this example, the method (1100) includes forming (1101) a depression into a bonding area of a backside surface of a substrate of a print head where the bonding area is formed proximate an ink feed slot formed through the thickness of the substrate from the backside surface to a front side surface, placing (1102) an adhesive between the bonding area and a substrate carrier, and moving (1103) the substrate and the substrate carrier together such that the adhesive flows into the depression.

In some examples, forming the depression into a bonding area includes removing an etchant resistant layer formed on the backside surface with laser machining. The depressions may be formed with wet etching an area of the backside surface exposed from removing the etchant resistant layer.

In some examples, the bonding area is located between an ink feed slot and another ink feed slot formed in the backside surface of the substrate. Forming the depressions may include forming a first groove and a second groove where the first groove runs along a first length of a first ink feed slot and the second groove runs along a second length of the second ink feed slot. In other examples, forming the depressions includes forming a groove that runs along a length of one of the ink feed slots and where the groove has a width that spans at least fifty percent of a distance from the first ink feed slot to the second ink feed slot.

In some examples, profiling the backside surface of the substrate to form the ink feed slots and the depressions includes laser machining an etchant resistant layer formed in the backside surface to form the openings for the ink feed slots, laser machining the etchant resistant layer to form the openings for the depressions, deep laser cutting to form a trench in the substrate, and silicon wet etching to complete the formation of the ink feed slots and the depressions. In some examples, the trench is approximately 600 microns and the total thickness of the substrate is approximately 675 microns. In this example, wet etching may last for ninety minutes.

In other examples, profiling the backside surface of the substrate to form the ink feed slots and the depressions includes laser machining the etchant resistant layer formed on the backside surface of the substrate to form openings for the ink feed slots and the depressions, cleaning the backside surface of the substrate from any debris resulting from the laser machining, depositing a metal dry etch mask onto the backside surface of the substrate, laser machining a deep laser trench to a depth of approximately 500 microns, removing the resulting thin substrate membranes from the laser trenching machining with a dry etch process (such as alternating SF6 etch and C4F8 deposition), and silicon wet etching to complete the formation of the ink feed slots and the depressions. In this example, the wet etching may last for fifty minutes.

In yet another example, profiling the backside surface of the substrate to form the ink feed slots and the depressions includes coating and patterning the backside surface of a substrate with an etchant resistant layer, dry etching to remove the etchant resistant layers to expose the areas intended to become the ink feed slots and depressions, removing any resists (material was intended to temporarily mask selected portions of the substrate from etching), depositing a metal dry etch mask, patterning the trenched area for a dry etch, dry etching a deep trench to initially break through the front side surface of the substrate, and silicon wet etching to complete the formation of the ink feed slots and the depressions. In such an example, the wet etch may last for approximately fifty minutes.

In some examples, the depth of the depressions is controlled by the initial depth formed during the laser machining process. In some examples, the initial depth is approximately six microns. The remainder of the depression's size may be controlled by the type of etchant and the etching time. In some examples, the final depression depth is approximately 90 to 150 microns.

Figure 12:
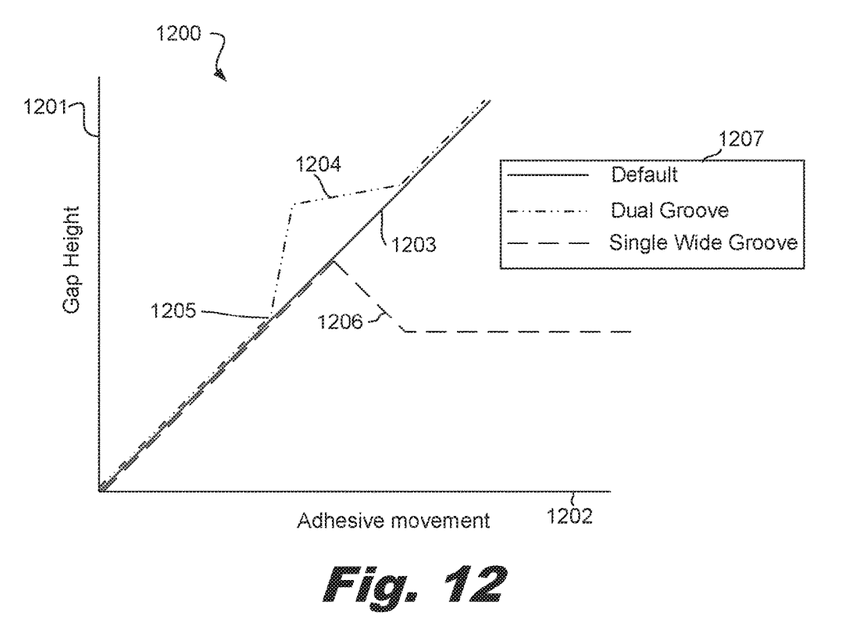
FIG. 12 is a diagram of an illustrative chart depicting gap heights verse depression distances from ink feed slots, according to principles described herein.

FIG. 12 is a diagram of an illustrative chart (1200) depicting gap heights verse depression distances from ink feed slots, according to principles described herein. In this example, the chart (1200) has a y-axis (1201) that schematically represents the gap height between the substrate and the substrate carrier, and an x-axis (1202) that schematically represents the distance that the adhesives will move as the substrate carrier and the substrate move together. The movement is measured from how far the edge of the adhesive moves with respect to a central axis of the adhesive. Each situation depicted in the chart (1200) uses the same volume of adhesive. A legend (1207) illustrates which lines (1203, 1204, 1206) correspond to which situation.

In this example, the default case, which is schematically represented with solid line (1203), accounts for the movement that occurs when the bonding areas are substantially flat with no depressions. In such a case, the relationship between the gap height and the adhesive movement is linear. However, in cases where the bonding areas have two grooves, as schematically represented by line (1204), the relationship starts out linear. However, at specific gap height (1205), the movement substantially decreases. In the case where a single wide groove is used, which is schematically represented with line (1206), the relationship also non-linear.

While the depressions above have been described with specific reference to the bonding areas formed on the backside surface of the substrate, the depressions may be formed in a surface of the substrate carrier. In some examples, the depressions are located such that an adhesive may flow into the depression as the substrate and the substrate carrier are moved together.

While the depressions have been described above with specific configurations and geometries, any depression configuration or geometry that prevents adhesives from bulging into the ink feed slots may be used. For example, the depressions may be grooves, dimples, recesses, pits, craters, other forms of depressions, or combinations thereof. In some examples, the depression includes multiple grooves, multiple dimples, multiple recesses, multiple pits, multiple craters, multiples of other forms of depressions, or combinations thereof. In some examples, the depression runs along a length of the ink feed slot, normal to a length of the ink feed slot, angled with respect to the ink feed slot, other orientations, or combinations thereof. In examples where the depression is at least one groove, the groove may be substantially straight, curved, continuous, discontinuous, angles, bent, wavy, take on other forms, or combinations thereof. In examples where the depression is at least one groove, the groove may have a U-shaped cross section, a V-shaped cross section, a square shaped cross section, a rectangular shaped cross section, other shaped cross section, or combinations thereof.

While the examples above have been described with a specific number of ink feed slots, any number of ink feed slots may be used with the principles described herein. For example, a substrate may have between one and five ink feed slots.

The preceding description has been presented only to illustrate and describe examples of the principles described. This description is not intended to be exhaustive or to limit these principles to any precise form disclosed. Many modifications and variations are possible in light of the above teaching.

What is claimed is:

1. An ink cartridge comprising:
   an ink reservoir to store ink; and
   an integrated print head in fluid communication with the ink reservoir, the integrated print head comprising:
   a nozzle layer comprising a number of nozzles formed therein;
   a substrate having a frontside surface and a backside surface;
   an ink feed slot formed through a thickness of the substrate from the backside surface to the frontside surface;
   at least one depression comprising at least one retaining lip; wherein the at least one depression is formed in the backside of the substrate and are removed from the ink feed slot; and
   a number of ink chambers formed between the nozzle layer and the substrate.

2. The ink cartridge of claim 1, wherein the ink cartridge is a replaceable ink cartridge.

3. The ink cartridge of claim 1, wherein the at least one depression comprises a single groove between adjacent ink feed slots.

4. The ink cartridge of claim 1, wherein:
   the at least one depression comprises at least two depressions; and
   at least one of the at least two depressions is non-parallel with the ink feed slot.

5. The ink cartridge of claim 1, wherein:
   the at least one depression comprises at least two depressions; and
   at least one of the at least two depressions is formed along a width of the ink feed slot.

6. The ink cartridge of claim 1, wherein each of the at least one depressions joins a bonding area along the backside surface of the substrate to an inside wall of an adjacent ink feed slot.

7. The ink cartridge of claim 1, wherein the at least one depression comprises a surface selected from the group consisting of a pitted surface, a continuous surface, a discontinuous surface, and a dimpled surface.

8. The ink cartridge of claim 1, wherein a groove wall of the at least one depression extends into an adjacent ink feed slot.

9. A print head comprising:
   a substrate with a frontside surface and a backside surface;
   at least one ink firing chamber adjacent the frontside surface and an ink reservoir adjacent the backside surface; and
   an ink feed slot formed through a thickness of the substrate from the backside surface to the frontside surface;
   wherein:
   the backside surface comprises a bonding area proximate the ink feed slot and at least one depression formed in the bonding area; and
   the at least one depression comprises a groove that is formed in the substrate and a groove wall that extends into the ink feed slot.

10. The print head of claim 9, wherein the at least one depression comprises at least one shape selected from the group consisting of a convex surface, a concave surface, an angled surface, and a curved surface.

11. The print head of claim 9, wherein the at least one depression connects the bonding area to an inside wall of an adjacent ink feed slot.

12. The print head of claim 9, wherein the groove wall is angled relative to the ink feed slot.

13. An ink cartridge comprising:
    an ink reservoir to store ink; and
    an integrated print head in fluid communication with the ink reservoir, the integrated print head comprising:
    a substrate with a frontside surface and a backside surface;
    at least one ink firing chamber adjacent the frontside surface and an ink reservoir adjacent the backside surface; and
    an ink feed slot formed through a thickness of the substrate from the backside surface to the frontside surface;
    wherein:
    the backside surface comprises a bonding area proximate the ink feed slot and at least one depression formed in the bonding area; and
    the at least one depression comprises a groove that is formed in the substrate and a groove wall that extends into the ink feed slot.

14. The ink cartridge of claim 13, wherein the at least one depression comprises a single groove between adjacent ink feed slots.

15. The ink cartridge of claim 13, wherein each of the at least one depressions joins a bonding area along the backside surface of the substrate to an inside wall of an adjacent ink feed slot.

* * * * *

UNITED STATES PATENT AND TRADEMARK OFFICE
CERTIFICATE OF CORRECTION

| | |
|---|---|
| PATENT NO. | : 9,579,893 B2 |
| APPLICATION NO. | : 15/257625 |
| DATED | : February 28, 2017 |
| INVENTOR(S) | : Rio Rivas et al. |

It is certified that error appears in the above-identified patent and that said Letters Patent is hereby corrected as shown below:

In the Claims

In Column 9, Line 58, in Claim 1, delete "lip;" and insert -- lip, --, therefor.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*